Jan. 30, 1945. G. A. LYON 2,368,245
WHEEL STRUCTURE
Filed June 2, 1943
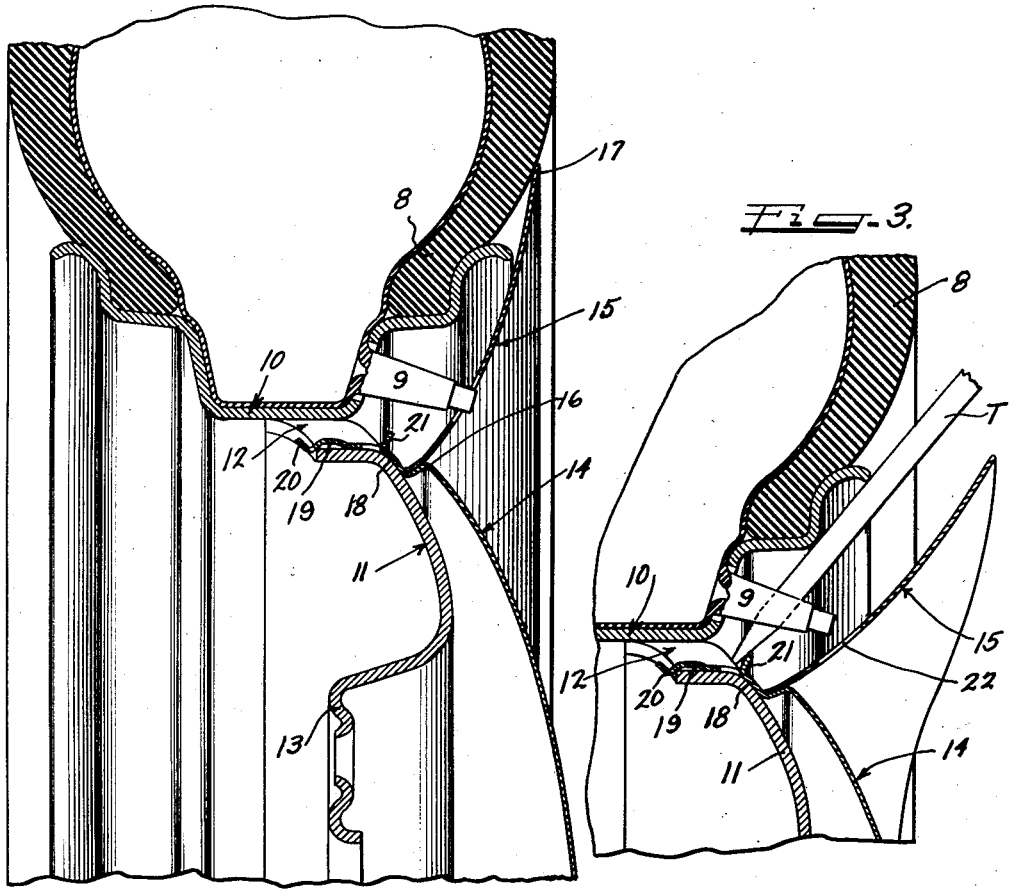
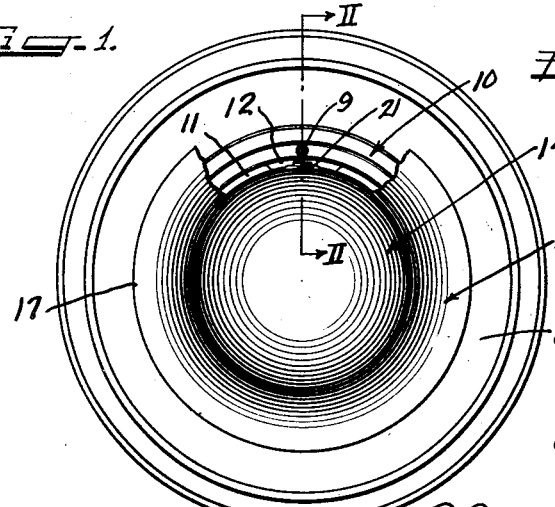
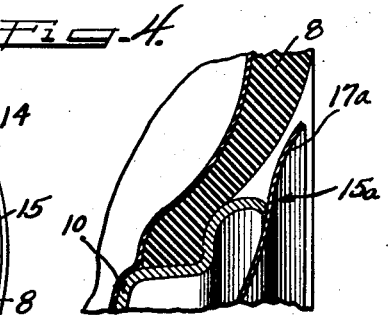
Inventor
GEORGE ALBERT LYON.
by Charlesworth Hills Attys.

Patented Jan. 30, 1945

2,368,245

UNITED STATES PATENT OFFICE 2,368,245

WHEEL STRUCTURE

George Albert Lyon, Allenhurst, N. J.

Application June 2, 1943, Serial No. 489,311

7 Claims. (Cl. 301—37)

This invention relates to a wheel structure, and more particularly to a novel wheel cover construction for concealing a tire rim and for covering a wheel body of an automobile wheel.

An object of this invention is to provide a wheel cover structure with novelly arranged but concealed pry-off means accessible under certain conditions for the purpose of prying the cover structure off the wheel.

Another object of this invention is to provide a wheel cover structure, including a flexible marginal portion which upon flexing is adapted to afford access to the rear of the same for the purpose of getting to a pry-off projection by means of which the structure may be removed from the wheel.

Still another object of this invention is to provide a highly ornamental wheel covering structure which may in part be made of a flexible resilient material or plastic and which by reason of its flexibility affords access to retaining means normally concealed thereby for the purpose of prying the cover structure off a wheel.

Still another object of this invention is to provide an improved and simplified wheel cover structure made in part of metal and in part of highly resilient material such as plastic, and which by reason of its flexibility affords certain mechanical advantages in the use of the device.

In accordance with the general features of this invention there is provided a wheel structure including a multiflanged tire rim and a wheel body joined thereto, a wheel cover structure comprising an outer annular trim section and a central wheel body covering section, said cover structure having normally concealed retaining means therefor, and the retaining means being accessible by the flexing of the trim ring section.

Another feature of the invention relates to the forming of the retaining means on the central section of the cover in such a manner that such means is provided with a pry-off lug which is accessible upon flexing of the trim ring section to enable the device to be pried free of the wheel.

Other objects and features of this invention will more fully appear from the following detail description taken in connection with the accompanying drawing illustrating an embodiment of the invention, and in which Figure 1 is a side view of a wheel provided with a cover having the features of this invention, a part of which cover is broken away to illustrate the location of the retaining means and the valve stem;

Figure 2 is an enlarged fragmentary cross-sectional view taken on the line II—II of Figure 1 looking in the direction indicated by the arrows showing my wheel cover structure in retained engagement with the wheel; and Figure 3 is an enlarged fragmentary cross-sectional view corresponding to the upper right-hand portion of Figure 2 and showing how the trim section of the cover may be bodily flexed to afford access to the valve stem and also to a pry-off lug by means of which the cover structure may be pried free of the wheel.

Figure 4 is an enlarged fragmentary cross-sectional view showing a modified form of trim ring.

On the drawing:

The reference character 8 designates generally a conventional automobile tire which is seated in the multiple flanges of a conventional drop-center rim which is designated generally by the reference character 10. Extending through an aperture in the rim in the usual way is the valve stem 9.

Attached at spaced intervals in a conventional way to the base flange of the tire rim 10 is a dished wheel body member 11 which like the rim is made of metal as is well-known in the art. It is preferably a stamping and includes the usual spaced air-circulating openings 12, the openings alternating with the areas at which the wheel body 11 is attached to the rim 10. Also the wheel body 11, as is customary, is provided at its center with a wheel fastening flange 13 by means of which the wheel is secured in a detachable manner either on the axle or to a spare wheel assembly.

In accordance with the features of this invention, there is provided a wheel cover structure which as illustrated embraces two concave-convex sections 14 and 15, the former of which being a wheel body covering section and the latter being a trim ring section for concealing the side flanges of the wheel rim. In the illustrated embodiment of the invention the wheel cover is made of dissimilar materials. That is to say the section 14 is preferably made of metal sheet and comprises a stamping, whereas the trim ring section 15 is made of a resilient self-sustaining material such, for example, as a synthetic plastic which will retain its form and have a high degree of resiliency. The two sections are concentrically arranged and are disposed in nested relationship. In other words, the annular trim ring section 15 is resiliently stretched over a shoulder 16 formed on the central body section 14 so as to be retained in a groove to the rear of the shoulder 16.

The trim ring section 15 is of such a cross-sectional contour and width as to extend clear from the tire to the central section 14 which may resemble a hub cap. In other words, the trim section 15 includes a marginal lip which extends beyond the outer edge of the rim flanges and intersects at 17 the side wall of the tire. This arrangement and construction is advantageous in that if the trim ring section has an external white appearance, it causes the over-all wheel to have the appearance of a large tire with a white side wall extending clear to the central body or hub cap section 14.

In addition, the trim ring section 15 by reason of the material of which it is made is flexible as shown in Figure 3 for the purpose of affording access to the valve stem and for the purpose of introducing a pry-off tool T behind the trim ring section; but it will always snap back to its original shape.

It is contemplated in accordance with the features of this invention to provide an edge for the application of the pry-off tool which is carried by the more rigid central section 14 instead of by the highly flexible trim ring section 15. To this end the outer shoulder or edge 16 of the central section 14 is provided with a rearwardly projecting ring section 18 which, as shown in Figures 2 and 3, is adapted to bottom or bear on the wheel body 11. Struck up or formed from this ring section 18 at spaced intervals are a plurality of axially extending retaining fingers 19 arranged and constructed to project into the wheel openings 12. Each of these fingers 19 includes a turned rear edge 20 adapted to retainingly engage the rear edge of the body member 11 at each of the openings 12.

Also formed from the annular or ring section 18 is one or more upwardly extending projections or lugs 21 which, as shown in Figure 3, is adapted to be engaged by the pry-off tool when the same is inserted behind the ring section 15. Thus by application of a pry-off force to the lug 21 it is possible to forcibly pry free the wheel structure from its retained engagement with the wheel body.

The wheel structure may be easily applied to the wheel body by pressing it axially against the wheel until the ring section 18 bears or is bottomed against the wheel body 11. At this time the rear hook-like ends 20 of the fingers 19 will have snapped over the rear edge of the wheel body to hold the cover on the wheel.

If it is so desired, the trim ring section 15 may be apertured at 22 for the purpose of affording access to the valve stem 9 without necessitating flexure of the ring section 15. In that event an air hose connection may be applied to the valve stem 9 by pressing inwardly on the trim ring section 15 about the hole 22.

I claim as my invention:

1. In a wheel construction including a multi-flanged tire rim and a wheel body joined together at a plurality of spaced areas, said wheel body being provided with openings between said spaced areas, a wheel cover structure comprising an outer annular trim ring, a central wheel body covering member, and cover retaining means at the junction of said rim and body, said retaining means having a pry-off lug concealed from the outer side of the wheel by said trim ring and said trim ring being bodily flexible to afford access to said pry-off lug for the purpose of prying said cover structure off the wheel.

2. In a wheel construction including a multi-flanged tire rim and a wheel body joined thereto, a wheel cover structure for concealing the rim and to also extend over the wheel body comprising an outer annular trim ring and a central wheel body covering member, said cover structure being provided with a pry-off projection positioned behind the trim ring to be concealed from the outer side of the wheel, and said trim ring being bodily flexible to afford access to said projection for the purpose of prying the cover structure off the wheel.

3. In a wheel construction including a multi-flanged tire rim and a wheel body joined thereto, a wheel cover structure for concealing the rim and to also extend over the wheel body comprising an outer annular trim ring and a central wheel body covering member, said cover structure being provided with a pry-off projection positioned behind the trim ring to be concealed from the outer side of the wheel, and said trim ring being bodily flexible to afford access to said projection for the purpose of prying the cover structure off the wheel, said pry-off projection being formed on retaining means adapted to have a snap-on detachable engagement with the wheel.

4. In a wheel construction including a multi-flanged tire rim and a wheel body connected thereto, a wheel cover structure comprising an outer annular trim ring for concealing the outer flanges of the tire rim, and a central wheel body covering member provided with rearwardly projecting retaining means cooperable with the wheel to detachably retain the cover structure thereon, said retaining means having a projection concealed from the outer side of the wheel by the trim ring by means of which the structure may be pried off of the wheel and said trim ring being bodily flexible to afford access to said pry-off projection.

5. In a wheel construction including a multi-flanged tire rim and a wheel body joined together at a plurality of spaced areas, said wheel body being provided with openings between said areas, a wheel cover structure comprising an outer annular trim ring for concealing the outer flanges of the tire rim, and a central wheel body covering member, said structure being provided at said openings with rearwardly projecting retaining means formed to extend into said openings and to detachably engage the wheel in said openings to hold the cover structure on the wheel, said retaining means also being provided with a pry-off lug, and said trim ring being resiliently flexible without permanently distorting the same to afford access to the pry-off lug for the purpose of prying the cover structure off the wheel and after flexure returning of its own accord to its original contour.

6. As an article of manufacture, a wheel cover structure for concealing the outer multiple flanges of a tire rim as well as for disposition over the body of the wheel, comprising an outer annular trim ring section of highly flexible resilient material which is bodily deflectable without permanent distortion, and a central wheel body section of relatively more rigid material on which said trim ring section is retained, said wheel body section being provided with rearwardly extending cover retaining means provided with a pry-off projection accessible upon the flexure of the trim ring section for the purpose of enabling a pry-off force to be applied thereto in the removal of the cover structure from the wheel.

7. In a wheel construction including a multi-flanged tire rim and a wheel body joined thereto, a wheel cover structure for concealing the rim and to also extend over the wheel body comprising an outer, annular trim ring and a central wheel body covering member retainingly associated therewith, retaining means extending inwardly of said cover structure for retaining, detachable engagement with a part of the wheel, said cover structure including a pry-off projection concealed from view on the outer side of the wheel, said annular trim ring being bodily flexible to afford access to the rear side thereof for the purpose of admitting a pry-off tool to engage said projection and pry the cover structure off the wheel.

GEORGE ALBERT LYON.